Patented Mar. 4, 1952

2,587,588

UNITED STATES PATENT OFFICE 2,587,588

METHOD OF PREPARING A DRYING OIL BY DEHYDROCHLORINATION

David A. Berry, Painesville, Ohio, assignor to Diamond Alkali Company, Cleveland, Ohio, a corporation of Delaware No Drawing. Application December 24, 1947, Serial No. 793,755

7 Claims. (Cl. 260—654)

This invention relates to dehydrochlorination of highly chlorinated, relatively high molecular weight, organic materials and more particularly relates to the preparation of oils having substantial drying properties from such chlorinated materials and especially from chlorinated paraffin.

The preparation of synthetic drying oils by dehydrochlorination of chlorinated materials has heretofore been proposed. In particular, it has been suggested to dehydrochlorinate various chlorinated organic materials using caustic soda as the hydrogen chloride sequestering agent in aqueous or alcohol solution, both in inert atmospheres and in the presence of polymerization inhibitors. These reactions have envisioned the use of high pressures and temperatures for considerable periods of time in order to effect the dehydrochlorination. Such prior proposals, however, have met with substantially no success principally because no matter what polymerization inhibitor or inert atmospheres are employed in the course of the reaction, it has not heretofore been possible to run such a reaction and obtain a sufficient amount of dehydrochlorination to provide the necessary unsaturation in the molecules of the chlorinated substance treated without also obtaining a considerable amount of polymerization of the material prior to its recovery from the reaction mass, whereby an oil with the desired drying properties cannot be obtained. Thus, reactions of the general character of dehydrochlorination reactions, which have heretofore been proposed because of their drastic conditions of temperature, pressure, time of reaction, and the like have failed to provide a product which was a drying oil having anywhere near the equivalent drying and other properties of natural drying oils, such as linseed oil, tung oil, and the like.

The present invention contemplates the provision of a synthetic drying oil derived from highly chlorinated, relatively high molecular weight, organic hydrocarbons by a dehydrochlorination reaction, which reaction is run under such conditions that no polymerization inhibitors are required nor inert atmospheres necessary to inhibit the polymerization of the newly formed unsaturated material, since the same may be recovered from the reaction mass after relatively short time of reaction, under relatively mild conditions which do not promote premature polymerization. More particularly, the present invention envisions the running of the dehydrochlorination reaction in a solvent which permits relatively high temperatures to be obtained without pressure equipment, which temperatures, with the aid of catalysts, need only be maintained for very short periods of time, whereby the newly formed unsaturated material does not polymerize sufficiently to destroy the desired properties of the synthetic drying oil obtained by these means.

An additional feature of the present invention is the dehydrochlorination of highly chlorinated hydrocarbons as aforesaid employing an alkali metal hydroxide and a catalyst in a high boiling solvent which does not distill from the reaction mass in the presence of a further solvent which forms a relatively low boiling azeotropic mixture with the water formed in the reaction, which water is accordingly removed from the reaction mass as formed, whereby the alkali metal hydroxide concentration is not diluted, and high hydrogen chloride sequestering efficiency is thus maintained.

The present invention more particularly contemplates the method of dehydrochlorinating chlorinated hydrocarbon materials, an example of which is highly chlorinated paraffin wax, wherein an average of from 18 to 36 carbon atoms is present, and which chlorinated material contains from 30% to 50% of chemically combined chlorine, which dehydrochlorination method is carried out employing an alkali metal hydroxide, such as sodium hydroxide, as the hydrogen chloride sequestering agent in the presence of a catalyst chosen from the group of titanium oxide and zirconium oxide and of which zirconium oxide may be taken as an example, in a solvent chosen from the group of dihydric alcohols and dihydric ethers having from 2 to 6 carbon atoms, of which ethylene glycol may be taken as an example.

Under the conditions of the present invention and particularly employing the catalysts taught herein, reaction temperatures may conveniently be modified while still maintaining said temperatures at sufficiently high levels to insure complete and quick reaction, and reaction times may be drastically reduced over those proposed in the prior art, whereby the desired dehydrochlorination is obtained while at the same time the product is not maintained a high temperatures for long periods of time, so that little or no undesired premature polymerization takes place. The present reaction may, if desired, be run under pressure in conventional pressure equipment but it is a feature of the present invention that recourse to pressure is unnecessary and entirely satisfactory products useful as drying oils are obtained in high yield with the employment of relatively mild reaction conditions.

In general, it is preferred to run the reaction at temperatures of the order of 150–200° C., preferably in the general neighborhood of 160° C., which temperature may suitably be obtained preferably by adding a further solvent to the reaction mixture, which solvent forms an azeotropic mixture with the water formed in the reaction and thus determines the temperature of the reaction during the time that water exists in the reaction mass. Again in contrast to prior art practices, it has been found that the reaction need be run no longer than the azeotropic mixture is present in the reaction mass, that is, until all of the water has been removed. Thereafter, rather than carrying the temperature of the reaction to the higher distillation or reflux temperature of the main solvent, glycol, the reaction may be stopped and it is found that the dehydrochlorination has run in the presence of the catalyst sufficiently completely to obtain the desired unsaturation. For example, there may be used as an azeotropic component such substances as high boiling acyclic alcohols, an example of which is octyl alcohol, or high boiling alicyclic alcohols, an example of which is cyclohexanol, the latter substance boiling at about 160° C. with the water evolved in the reaction.

As the highly chlorinated materials to be used in the practice of the invention, there may be employed acyclic hydrocarbons of high molecular weight, including chlorinated oils, paraffin waxes, and other high molecular weight long carbon chain materials having both straight and branched chains and having, in general, from 18 to 36 carbon atoms. Paraffinic chlorohydrocarbons having carbon chains of this length are especially useful, particularly such paraffinic chlorohydrocarbons having an average chain length of 24 carbon atoms. It will be appreciated that such materials are usually found in the form of mixtures rather than as pure compounds, and the mixtures of these materials are particularly well-suited for the purposes of this invention. These materials may suitably be chlorinated by known means, including the chlorination of such materials at relatively mild temperatures in solution in a solvent, such as carbon tetrachloride, and preferably in the presence of actinic light, until a chlorine content of the order of 30–50% of chemically combined chlorine is obtained. Methods of chlorination of such materials are well-known and form no part of this invention. By such methods, an average $C_{24}$ paraffinic hydrocarbon may be chlorinated to the extent that it contains 30% of chemically combined chlorine and has an average of 4 chlorine atoms per average chlorohydrocarbon molecule. An average $C_{24}$ chlorohydrocarbon of the same character, having 40% of chemically combined chlorine, may be obtained by the same methods and contains about 7 chlorine atoms per average chlorohydrocarbon molecule; a 50% chlorinated material of this character contains between 9 and 10 chlorine atoms per molecule. Particularly suitable substances of this class of materials are those hydrocarbons which, when so chlorinated, are liquids at room temperature.

A wide range of concentration of alkali metal hydroxides, of which caustic soda is preferred though potassium, lithium, and caesium hydroxides are equally useful though less attractive economically, may be employed in the dehydrochlorination reaction, it having been found particularly suitable to use a 50% solution of caustic soda in the glycol type solvent. The alkali metal hydroxide may be used in an amount equal to at least a slight excess over the molecular equivalent amount of hydrogen chloride to be removed. As the principal solvent for the alkali metal hydroxide may be employed, in addition to those already referred to, propylene, butylene, and amylene glycols, diethylene, dipropylene, and dibutylene glycols, the hydroxyl groups being attached to either primary or secondary carbon atoms, such as in butanediol-2,3 or both primary and secondary, such as in butanediol-1,3. To these materials may suitably be added from 1% to 5% of the metal oxide catalyst, based upon the amount of chlorinated paraffin present. An amount of the azeotropic mixture forming material, such as cyclohexanol, of the same order as the volume of the chlorinated hydrocarbon reacted, may also be added to the reaction mass. Upon heating, when the reaction mass reaches a temperature, in the case of the use of cyclohexanol, of the order of 160° C., water is evolved in the dehydrochlorination reaction and distilled off of the reaction mass with the cyclohexanol in the azeotrope at about 160° C. Upon the completion of the distillation of water from the reaction mass, which involves generally a period of from 1 to 5 hours, the reaction is complete.

An examination of the material obtained after working up shows that chlorine has been removed therefrom to the extent that an average of less than one atom of chlorine per average molecule of hydrocarbon remains, so that in a material originally containing 30% of chemically combined chlorine, more than 3 double bonds have been inserted; in a 40% material, more than 6 double bonds have been inserted; and in a 50% material, of the order of 9 to 10 double bonds have been inserted.

The thus recovered material, as will be particularly understood in view of the large number of double bonds inserted, is an excellent drying material and dries to a relatively hard, tough, film when spread on a surface in approximately the same time as such natural drying oils, such as linseed oil and tung oil. Furthermore, when customary drying agents, such as cobalt naphthenate, and the like, are added, the drying time is decreased and the toughness of the film is equal to or better than that of the natural drying oils. An additional feature of the drying oils of the invention is their relative cheapness as compared with well-known natural drying oils, which cheapness these materials enjoy while still possessing properties equal to or better than the natural oils themselves.

The oils of this invention may be compounded into paints and other surface protecting compositions in a well-known manner and to provide paints and the like of equal or better properties than those possessed by paints based upon the natural drying oils.

In order to inform those skilled in the art more particularly of the practice of the present invention but in no sense to be taken as limiting upon the scope of the invention described herein, which invention may only be interpreted in accordance with the appended claims, the following specific examples of the practice of the invention are set forth.

*Example I*

A 3-neck flask is equipped with a water removing condenser, a stirrer, and a thermometer and is charged with 300 cc. of ethylene glycol, and 150 gms. of solid caustic soda is dissolved therein. 300 gms. of 40% chlorinated paraffin are dissolved in 300 cc. of cyclohexanol and added to the solution. 10 gms. of zirconium dioxide are then added and the temperature of the vessel is raised until water comes off in the water-cyclohexanol azeotrope, which is about 160° C., and held there for 6 hours. During the 6-hour period, all water of reaction is removed. The batch is cooled and 500 cc. of water are added to form a two-phase system; the salt formed during the reaction and the glycol dissolve in the water phase, with the oil in cyclohexanol solution forming the second phase. The steam distillation residue is dried and upon analysis, is found to contain about 3.2% chlorine, from which it may be seen that more than 6 hydrogen chloride molecules have been removed per average chlorohydrocarbon molecule and thus more than 6 double bonds have been inserted. The oil, when spread on a surface, dries without the addition of drying aids or heat treatment in about the same time as linseed oil. The oil is a light-colored material and makes a relatively colorless film on a glass plate. When placed on a surface and heated thereon in an oven for two hours at 150° C., a tough, entirely dry, non-tacky material is obtained comparable to linseed oil dried under the same conditions.

*Example II*

180 gms. of solid caustic soda is dissolved in 500 cc. of ethylene glycol. To this mixture is added 300 gms. of 40% chlorinated paraffin dissolved in 300 cc. of cyclohexanol. 5 gms. of titanium dioxide are added as a catalyst. The mixture is heated to the boiling temperature of the water-cyclohexanol azeotrope, about 160° C., until all of the water has come off, the mixture retaining a very light color throughout the entire reaction. At the end of about 5 hours and when all the water has been removed, the reaction mixture is cooled, 500 cc. of water are added, the oil layer is separated, and steam distilled. The chlorine content of the recovered oil is found to be 3.9%, representing again a removal of over 6 hydrogen chloride molecules per average chlorohydrocarbon molecule and thus, the insertion of over 6 double bonds in the dehydrochlorinated materials. When spread on a glass plate and heated for two hours at 150° C., a hard, tough film results with no signs of tackiness. The film is comparable in its properties to that obtained from linseed oil heated in the same manner.

*Example III*

A flask similar to that used in Example I is charged with 300 cc. of ethylene glycol, and 150 gms. of solid caustic soda is dissolved therein. To this mixture is added 300 gms. of 40% chlorinated paraffin dissolved in 300 cc. of cyclohexanol. 2½ gms. of zirconium dioxide are then added. The mixture is held at the boiling point of the azeotrope until no more water is given off, which takes about 1½ hours. The reaction mass is then cooled and 500 cc. of water are added to dissolve the solid materials. The oil layer is separated and steam distilled. The chlorine content is found to be 4.7% or equivalent to the removal of more than 6 hydrogen chloride molecules from the material. The dehydrochlorinated material is very light in color and has properties similar to those described for the materials of Examples I and II.

A further feature of the invention lies in the ease with which the solvents and the salt formed in the reaction may be recovered and the solvents reused for further reaction to make further quantities of drying oil. Particularly in view of these recycling aspects, it is apparent that the present invention is adapted both to batch process and to continuous process operations. An example of the reuse of used materials follows:

*Example IV*

A 3-neck flask, equipped as in Example I, is charged with 300 cc. of ethylene glycol and 150 gms. of solid caustic soda. 300 gms of 40% chlorinated paraffin dissolved in 300 cc. of cyclohexanol is added to the mixture. 10 gms. of zirconium dioxide are then added. The mixture is held at the boiling temperature of the azeotrope for about 5 hours at 160° C. with removal of the water formed during the reaction and collection of the cyclohexanol-water mixture. The reaction mass is cooled and filtered, the filtrate consisting of ethylene glycol, cyclohexanol, and the desired product. This filtrate separates into two layers, the oil layer being removed and subjected to steam distillation and the solvent being recovered therefrom as part of the distillate. The aqueous layer from the filtrate is also recovered.

The drying oil obtained in this example is identical with that of Example I; an examination of the recovered solvents shows that 100% of the glycol is recovered and about 85% of the cyclohexanol.

A 3-neck flask, equipped as in this example, is charged with the recovered glycol (300 cc.) and 150 gms. of caustic, 300 gms. of 40% chlorinated paraffin dissolved in 300 cc. of cyclohexanol comprising the recovered cyclohexanol and further added cyclohexanol and 10 gms. of zirconium oxide. The reaction is carried out in the manner of this example. The resulting oil, when worked up, is found to have the same properties as that obtained in this example by the use of new materials.

*Example V*

A flask is equipped with a reflux condenser having a side arm for water removal, a thermometer, and a stirrer, and is charged with 300 cc. of ethylene glycol with 150 gms. of solid caustic soda dissolved therein. 300 gms. of 40% chlorinated paraffin are added to the flask and 10 gms. of zirconium dioxide. The contents of the flask are heated with stirring to reflux temperature, about 180° C., for about 7 hours, the water formed in the reaction being constantly removed as formed, and the temperature reaching during a final hour about 205° C., making a total of 8 hours in all for the reaction. The reaction mass is cooled to room temperature and 500 cc. of water are added to dissolve the glycol, whereupon a two layer system forms. The glycol layer is removed and the oil layer dried over anhydrous calcium chloride. Upon analysis, it is found that chlorine has been removed to an extent equal to that described in the other examples and that the oil upon heating at 150° C. for 8 hours dries to a hard, tough, film of excellent properties.

While there have been described in detail certain forms of this invention and specific examples of its practice, the invention is not to be understood as being limited to such examples as it is realized that changes within the scope of the invention are possible, and it is further intended that each step in the following claims shall refer to all equivalent steps for accomplishing the same result in substantially the same or equivalent manner, it being intended to cover this invention broadly in whatever form its principle may be utilized.

What is claimed is:

1. The method of making a drying oil by dehydrochlorinating a chlorinated paraffinic hydrocarbon having between 18 and 36 carbon atoms and having an average between 4 and 10 chlorine atoms to each molecule to a point where said molecules have less than one chlorine atom on the average, which includes the steps of reacting said chlorinated hydrocarbon with alkali metal hydroxide in a solvent chosen from the group of dihydric alcohols and dihydric ethers having from 2 to 6 carbon atoms in the presence of a catalyst chosen from the group of titanium dioxide and zirconium dioxide, and separately recovering the dehydrochlorinated product.

2. The method of making a drying oil by dehydrochlorinating a chlorinated paraffinic hydrocarbon having between 18 and 36 carbon atoms and having an average between 4 and 10 chlorine atoms to each molecule to a point where said molecules have less than one chlorine atom on the average, which includes the steps of reacting said chlorinated hydrocarbon with caustic soda in a solvent chosen from the group of dihydric alcohols and dihydric ethers having from 2 to 6 carbon atoms in the presence of a catalyst chosen from the group of titanium dioxide and zirconium dioxide, and separately recovering the dehydrochlorinated product.

3. The method of making a drying oil by dehydrochlorination of a chlorinated paraffinic hydrocarbon having between 18 and 36 carbon atoms and between 4 and 10 chlorine atoms in the molecule to an extent that said molecules shall have less than one chlorine atom on the average, which includes the steps of reacting said chlorinated hydrocarbon with an alkali metal hydroxide in ethylene glycol solution in the presence of a catalyst chosen from the group of titanium oxide and zirconium oxide.

4. The method of making a drying oil from chlorinated paraffin wax, wherein the paraffin wax has from 18 to 36 carbon atoms in the chain and the chlorine is present in an amount of 40% of chemically combined chlorine, to a point where said molecules have less than one chlorine atom on the average which includes the steps of reacting said chlorinated paraffin with caustic soda in ethylene glycol solution at a temperature of between 100 and 200° C. in the presence of a catalyst chosen from the group of titanium oxide and zirconium oxide and separately recovering the dehydrochlorinated product.

5. The method of making a drying oil from chlorinated paraffin wax wherein the chlorinated wax has from 18 to 36 carbon atoms in the chain and having an average of between 4 and 10 chlorine atoms to a point where said molecules have less than one chlorine atom on the average which includes the steps of reacting said chlorinated paraffin with caustic soda in ethylene glycol solution in the presence of a catalyst chosen from the group of titanium oxide and zirconium oxide, at a temperature of substantially 160° C. for a period of about five hours in the presence of cyclohexanol, and continuously removing the cyclohexanol water azeotrope.

6. The method of making a drying oil from chlorinated paraffin wax, wherein the paraffin wax consists of molecules averaging between 18 and 36 carbon atoms in the chain and chlorine is present in said molecules in an amount of between 30% and 50% of chemically combined chlorine, which includes the steps of dehydrochlorinating said chlorinated paraffin with alkali metal hydroxide in a solvent chosen from the group of dihydric alcohols and dihydric ethers having from 2 to 6 carbon atoms in the presence of a catalyst chosen from the group of titanium oxide and zirconium oxide, the reaction being run at a temperature between about 150° and 200° C. for a period of about one to five hours, to a point where said molecules have less than one chlorine atom on the average and in the presence of an azeotrope forming substance for water chosen from the group consisting of cyclohexanol and octyl alcohol.

7. The method as claimed in claim 6 wherein the azeotrope forming material is cyclohexanol.

DAVID A. BERRY.

REFERENCES CITED

The following references are of record in the file of this patent:

UNITED STATES PATENTS

| Number | Name | Date |
|---|---|---|
| 1,384,447 | Gardner et al. | July 12, 1921 |
| 2,176,500 | Hyatt | Oct. 17, 1939 |
| 2,322,258 | Strosacker et al. | June 22, 1943 |
| 2,441,602 | Snow et al. | May 18, 1948 |

FOREIGN PATENTS

| Number | Country | Date |
|---|---|---|
| 565,160 | Germany | May 24, 1930 |